United States Patent
Yokoyama et al.

(10) Patent No.: US 12,482,302 B2
(45) Date of Patent: Nov. 25, 2025

(54) SERVER, CONTROL DEVICE FOR VEHICLE, AND MACHINE LEARNING SYSTEM FOR VEHICLE

(71) Applicant: Toyota Jidosha Kabushiki Kaisha, Toyota (JP)

(72) Inventors: Daiki Yokoyama, Gotemba (JP); Ryo Nakabayashi, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 933 days.

(21) Appl. No.: 17/393,795

(22) Filed: Aug. 4, 2021

(65) Prior Publication Data
US 2022/0044497 A1 Feb. 10, 2022

(30) Foreign Application Priority Data
Aug. 7, 2020 (JP) .................................. 2020-134806

(51) Int. Cl.
G07C 5/00 (2006.01)
G06F 1/3206 (2019.01)
G06F 9/355 (2018.01)
G06N 3/082 (2023.01)

(52) U.S. Cl.
CPC .......... G07C 5/008 (2013.01); G06F 1/3206 (2013.01); G06F 9/3555 (2013.01); G06N 3/082 (2013.01)

(58) Field of Classification Search
CPC ..... G07C 5/008; G06F 1/3206; G06F 9/3555; G06N 3/082
See application file for complete search history.

(56) References Cited

U.S. PATENT DOCUMENTS

| | | | | |
|---|---|---|---|---|
| 2014/0189702 | A1* | 7/2014 | Yan ....................... | G06F 9/5027 718/104 |
| 2015/0199617 | A1* | 7/2015 | Kuwajima ............. | G06N 20/00 706/20 |
| 2016/0358070 | A1* | 12/2016 | Brothers ................ | G06N 3/082 |
| 2018/0300610 | A1* | 10/2018 | Pye ........................ | G06N 3/045 |

(Continued)

FOREIGN PATENT DOCUMENTS

| | | |
|---|---|---|
| JP | 2019-183698 A | 10/2019 |
| JP | 2020-067911 A | 4/2020 |
| WO | 2018/173121 A1 | 9/2018 |

OTHER PUBLICATIONS

Heppe et al., "Resource-Constrained On-Device Learning by Dynamic Averaging," 2020, arXiv:2009.12098v1 (Year: 2020).*

(Continued)

*Primary Examiner* — Michael J Huntley
*Assistant Examiner* — Incent Anton Spraul
(74) *Attorney, Agent, or Firm* — Dinsmore & Shohl LLP

(57) ABSTRACT

A server including a processor configured to: receive a data set from a vehicle; create a plurality of learned models of different scales by performing machine learning using the data set; receive from the vehicle information on computing power of an electronic control unit that controls the vehicle by applying the learned model; and transmit the learned model to the vehicle, wherein the processor is configured to transmit the learned model of a larger scale to the vehicle equipped with the electronic control device having high computing power, than to the vehicle equipped with the electronic control device having low computing power.

15 Claims, 9 Drawing Sheets

(56) References Cited

U.S. PATENT DOCUMENTS

| | | | |
|---|---|---|---|
| 2019/0147360 A1* | 5/2019 | Matsumoto | G06N 20/00 |
| | | | 709/203 |
| 2019/0204089 A1* | 7/2019 | Rochan Meganathan | |
| | | | G01S 13/89 |
| 2019/0220043 A1* | 7/2019 | Zamora Esquivel | G06V 10/82 |
| 2019/0294934 A1* | 9/2019 | Shestak | G06V 20/588 |
| 2019/0311262 A1 | 10/2019 | Nagasaka et al. | |
| 2019/0324809 A1* | 10/2019 | Zhao | G06F 9/505 |
| 2020/0014761 A1 | 1/2020 | Kawaai et al. | |
| 2020/0132011 A1* | 4/2020 | Kitagawa | G06N 3/084 |
| 2020/0219015 A1 | 7/2020 | Lee et al. | |

OTHER PUBLICATIONS

Zhang et al., "OpenEI: An Open Framework for Edge Intelligence," 2019 IEEE 39th International Conference on Distributed Computing Systems (ICDCS) (Year: 2019).*

Zhang et al., "Model-Switching: Dealing with Fluctuating Workloads in Machine-Learning-as-a-Service Systems," Jul. 2020, Proceedings of the 12th USENIX Conference on Hot Topics in Cloud Computing (Year: 2020).*

* cited by examiner

|  | ECU_A | ECU_B | ECU_C | ECU_D |
|---|---|---|---|---|
| CLOCK FREQUENCY | 3[GHz] | 2[GHz] | 5[GHz] | 1[GHz] |
| NUMBER OF CORES | 4 | 2 | 6 | 2 |
| MEMORY CAPACITY | 6GB | 4GB | 8GB | 2GB |
| COMPUTING POWER | 72 | 16 | 240 | 4 |

SERVER, CONTROL DEVICE FOR VEHICLE, AND MACHINE LEARNING SYSTEM FOR VEHICLE

CROSS-REFERENCE TO RELATED APPLICATION

This application claims priority to Japanese Patent Application No. 2020-134806 filed on Aug. 7, 2020, incorporated herein by reference in its entirety.

BACKGROUND

1. Technical Field

The present disclosure relates to a server, a control device for a vehicle, and a machine learning system for a vehicle.

2. Description of Related Art

There is known a technology in which data acquired in a vehicle is received by a communication unit of a server, a data set is created using the received data, learning is performed according to the data set, and the learned model is transmitted from the server to the vehicle (see, for example, Japanese Unexamined Patent Application Publication No. 2019-183698 (JP 2019-183698 A)).

SUMMARY

However, the types of vehicles that receive the learned model from the server vary, and the computing power of an in-vehicle computer that each vehicle is equipped with also varies. When the server uniformly provides the learned model to each vehicle without considering the computing power of the in-vehicle computer, there is a possibility that the learned model cannot be used in a vehicle equipped with an in-vehicle computer having a relatively low computing power.

In view of the above issue, an object of the present disclosure is to provide a server, a control device for a vehicle, and a machine learning system for a vehicle that enable the use of a learned model in accordance with the computing power of the control device provided in the vehicle.

The gist of the present disclosure is as follows.

An aspect of the present disclosure relates to a server including a processor configured to: receive a data set from a vehicle; create a plurality of learned models of different scales by performing machine learning using the data set; receive, from the vehicle, information on computing power of an electronic control unit that controls the vehicle by applying the learned model; and transmit the learned model to the vehicle, wherein the processor is configured to transmit the learned model of a larger scale to the vehicle equipped with the electronic control unit having high computing power, than to the vehicle equipped with the electronic control unit having low computing power.

In the above aspect, the processor may be configured to perform the machine learning by a neural network.

In the above aspect, the scale of the learned model may be larger as the number of hidden layers or the number of nodes existing in the hidden layers increases.

In the above aspect, the processor may be configured to: create the learned model for each region in which the vehicle travels, the learned model being of a larger scale as the region is larger; and transmit the learned model corresponding to the region in which the vehicle currently travels based on position information of the vehicle.

In the above aspect, the processor may be configured to transmit the learned model at a higher transmission frequency to the vehicle equipped with the electronic control unit having low computing power, than to the vehicle equipped with the electronic control unit having high computing power.

Another aspect of the present disclosure relates to a control device of a vehicle that controls the vehicle by applying a learned model, the control device including a processor configured to: transmit information on computing power of the control device to a server; receive the learned model of a scale corresponding to the computing power from the server; and control the vehicle by applying the learned model of the scale corresponding to the computing power, the learned model being received from the server.

In the above aspect, the processor may be configured to: transmit a data set to the server; and receive the learned model created by the server by performing machine learning using the data set.

In the above aspect, the server may perform the machine learning by a neural network; and the scale of the learned model may be larger as the number of hidden layers or the number of nodes existing in the hidden layers increases.

In the above aspect, the processor may be configured to: receive the learned model corresponding to a region in which the vehicle currently travels for each region in which the vehicle travels; and receive the learned model of a larger scale as the region is larger.

In the above aspect, the processor may be configured to receive the learned model at a higher reception frequency as the computing power is lower.

Another aspect of the present disclosure relates to a machine learning system for a vehicle, the machine learning system including: a server that creates a learned model by performing learning using a data set received from the vehicle; and a control device for the vehicle for controlling the vehicle by applying the learned model, wherein: the control device includes a first processor configured to: transmit the data set to the server; transmit information on computing power of the control device to the server; receive the learned model of a scale corresponding to the computing power from the server; and control the vehicle by applying the learned model of the scale corresponding to the computing power, the learned model being received from the server; and the server includes a second processor configured to: receive the data set from the vehicle; create a plurality of learned models of different scales by performing machine learning using the data set; receive information on the computing power of the control device from the vehicle; transmit the learned model to the vehicle; and transmit the learned model of a larger scale to the vehicle equipped with the control device having high computing power, than to the vehicle equipped with the control device having low computing power.

In the above aspect, the second processor may be configured to perform the machine learning by a neural network.

In the above aspect, the scale of the learned model may be larger as the number of hidden layers or the number of nodes existing in the hidden layers increases.

In the above aspect, the second processor may be configured to: create the learned model for each region in which the vehicle travels; create the learned model of a larger scale as the region is larger; and transmit the learned model corresponding to the region in which the vehicle currently travels based on position information of the vehicle; and the first processor may be configured to receive the learned model corresponding to the region in which the vehicle currently travels for each region in which the vehicle travels.

In the above aspect, the second processor may be configured to transmit the learned model at a higher transmission frequency to the vehicle equipped with the control device having low computing power, than to the vehicle equipped with the control device having high computing power; and the first processor may be configured to receive the learned model at a higher reception frequency as the computing power is lower.

According to the present disclosure, it is possible to provide the learned model to the vehicle according to the computing power of the control device included in the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION

Hereinafter, several embodiments according to the present disclosure will be described with reference to the drawings. However, these descriptions are intended merely to illustrate embodiments of the present disclosure and are not intended to limit the present disclosure to such particular embodiments.

Figure 1:
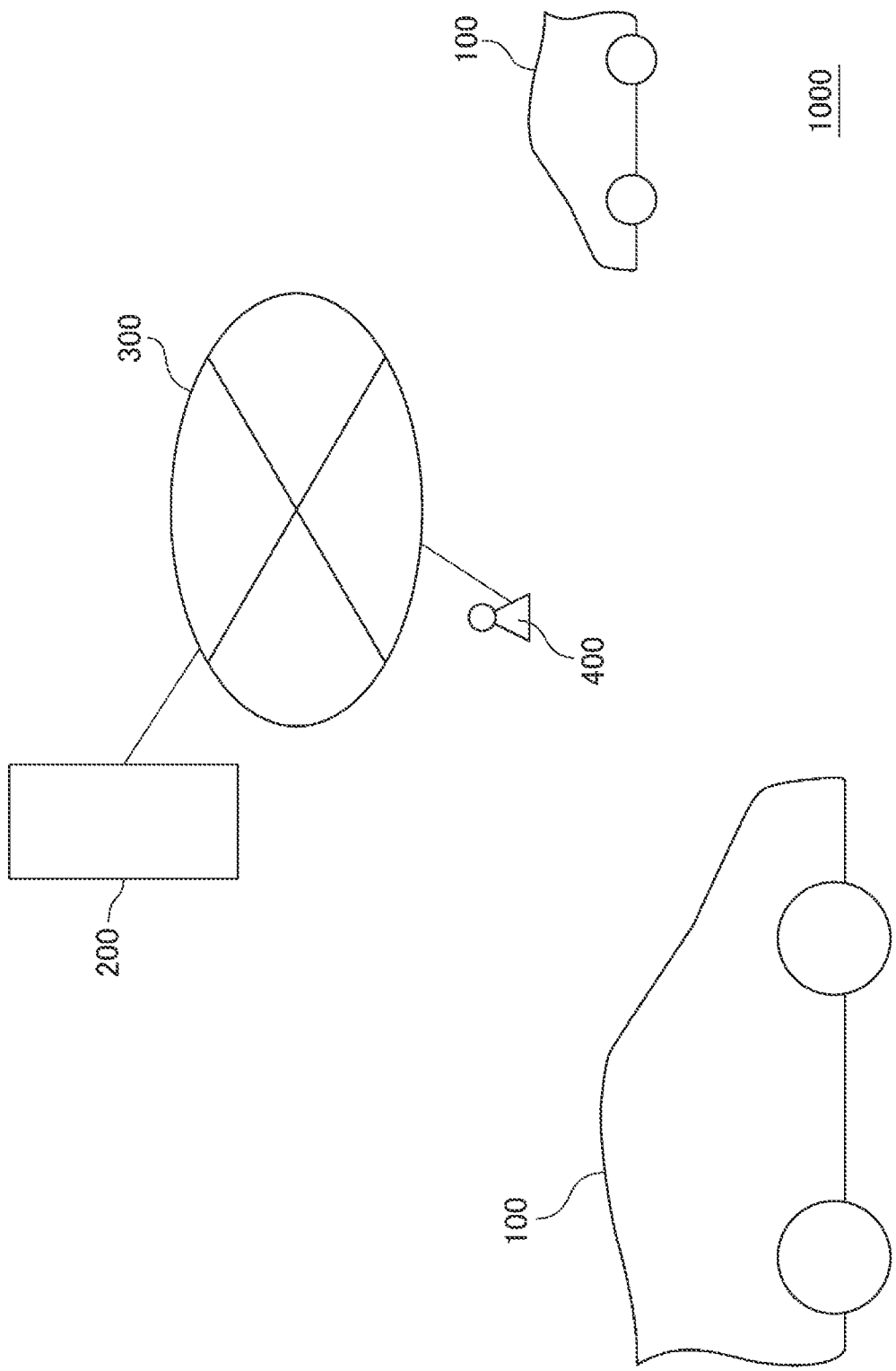
FIG. 1 is a schematic diagram showing a configuration of a machine learning system for a vehicle according to an embodiment.

FIG. 1 is a schematic diagram showing a configuration of a machine learning system 1000 for a vehicle according to an embodiment. The machine learning system 1000 has a plurality of vehicles 100 and a server 200. The vehicles 100 are manually driven vehicles that are manually driven by a driver, autonomous vehicles that can travel autonomously, and the like. Each vehicle 100 and the server 200 can communicate with each other via a communication network 300 composed of an optical communication line or the like and a radio base station 400 connected to the communication network 300 via a gateway (not shown). That is, the radio base station 400 relays the communication between each vehicle 100 and the server 200.

Each vehicle 100 collects various types of information such as an image taken by an in-vehicle camera, information representing a driving state, and information representing the environment around the vehicle, creates learning data sets from the information, and transmits the data sets to the server 200. The server 200 is provided in a management center. The management center causes the server 200 to learn the data sets, and provides the learned models obtained as a result of the learning to the vehicles 100 by using the server 200. Learning on the server 200 is performed by machine learning such as deep learning. In addition to this, the management center can perform various processes for controlling each vehicle 100 by using the server 200.

The server 200 performs learning based on the data sets acquired from the vehicles 100, and provides the learned models to each vehicle 100. Alternatively, the server 200 may perform learning based on the data sets acquired from a specific vehicle 100, and provide the specific vehicle 100 with a learned model specialized for the specific vehicle 100. Further, the server 200 may provide a vehicle 100 that has not transmitted the learning data set to the server 200 with a learned model created based on a data set acquired from another vehicle 100.

The performances of the vehicles 100 that communicate with the server 200 vary. An in-vehicle computer provided in each of the vehicles 100 differs depending on the performance of the vehicle 100. The higher the performance of the vehicle 100 is, the more sophisticated and precise vehicle control tends to be performed, so that an in-vehicle computer having higher computing power tends to be mounted.

As for the learned model provided from the server 200 to the vehicle 100, the larger the scale of the learned model is, the more complicated the model is, which is suitable for more sophisticated and precise vehicle control. The scale of the learned model is a value corresponding to the computing power (computing load) required to use the learned model. When the learned model is composed of a neural network, the scale of the learned model is represented by the number of hidden layers and the number of nodes existing in the hidden layers. The larger the number of hidden layers and the number of nodes existing in the hidden layers are, the larger the scale of the learned model is. As an example, the scale of the learned model is calculated by multiplying the average number of nodes existing per hidden layer by the number of hidden layers. As the number of hidden layers and the number of nodes in the hidden layers in the learned model increase, the number of weighting coefficients and the number of biases determined by learning increase, resulting in a model that more accurately represents the actual state. Therefore, a learned model of a larger scale is more suitable for more sophisticated and precise vehicle control. The scale of the learned model is also represented by the number of weighting coefficients and the number of biases determined by learning. The larger the number of weighting coefficients and the number of biases are, the larger the scale of the learned model is.

When the scale of the learned model exceeds the computing power of the in-vehicle computer, there is a possibility that the in-vehicle computer cannot perform calculations on the large-scaled and complicated learned model, and vehicle control by applying the learned model cannot be performed. Further, when the scale of the learned model is too small for the computing power of the in-vehicle computer, the accuracy of vehicle control by applying the learned model may decrease. Therefore, the vehicle 100 may be provided with a learned model suitable for the computing power in accordance with the computing power of the in-vehicle computer of the individual vehicle 100.

In the present embodiment, specification information indicating the computing power of the in-vehicle computer is transmitted from the vehicle 100 to the server 200. Based on the specification information, the server 200 transmits a learned model of a scale corresponding to the computing power of the in-vehicle computer to the vehicle 100. More specifically, the server 200 transmits a learned model of a larger scale when the computing power of the in-vehicle computer is high than when the computing power is low. This avoids the situation where vehicle control by applying the learned model cannot be performed due to the lack of the computing power of the in-vehicle computer. Further, vehicle control by applying the learned model is performed by making the best use of the computing power of the in-vehicle computer.

Figure 2:
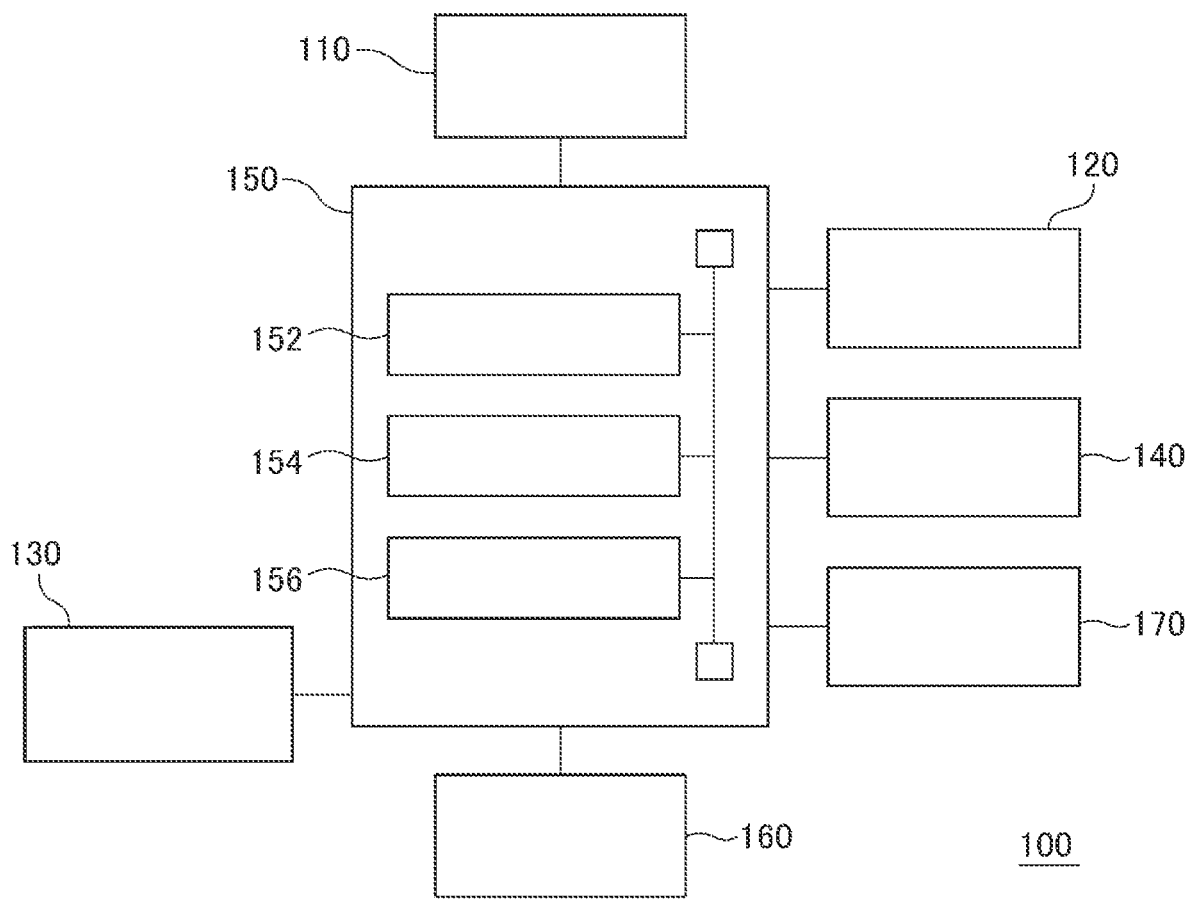
FIG. 2 is a schematic diagram showing a configuration of a vehicle control system mounted on the vehicle.

FIG. 2 is a schematic diagram showing a configuration of a vehicle control system mounted on the vehicle 100. The vehicle control system includes an in-vehicle camera 110, a positioning information receiver 120, a vehicle control device 130, a wireless terminal 140, an electronic control unit (ECU) 150, an environmental information acquisition sensor 160, and a driving state information acquisition sensor 170. The in-vehicle camera 110, the positioning information receiver 120, the vehicle control device 130, the wireless terminal 140, the ECU 150, the environmental information acquisition sensor 160, and the driving state information acquisition sensor 170 are connected so that communication is possible via an in-vehicle network that complies with standards such as controller area network (CAN) and Ethernet (registered trademark). In the present embodiment, each vehicle 100 has the same configuration regarding transmission of the learning data set to the server 200 and vehicle control by applying the learned model, and since the server 200 applies the same processes for each vehicle 100, one vehicle 100 will be described below unless otherwise necessary.

The in-vehicle camera 110 has a two-dimensional detector composed of an array of photoelectric conversion elements having sensitivity to visible light, such as a charge-coupled device (CCD) or a complementary metal-oxide-semiconductor (C-MOS), and an imaging optical system that forms an image of the region to be imaged on the two-dimensional detector. The in-vehicle camera 110 is provided on the dashboard inside the vehicle, near the windshield, or the like, and captures images of surroundings of the vehicle 100 (for example, in front of the vehicle 100) every predetermined imaging cycle (for example, $\frac{1}{30}$ second to $\frac{1}{10}$ second) to generate images showing the surroundings of the vehicle 100. The images obtained by the in-vehicle camera 110 may be color images. Further, the in-vehicle camera 110 may be composed of a stereo camera, or may be configured to acquire the distance between the in-vehicle camera 110 and each structure on the image from the parallax of the right and left images. Each time the in-vehicle camera 110 generates an image, the in-vehicle camera 110 outputs the generated image to the ECU 150 via the in-vehicle network.

The positioning information receiver 120 acquires positioning information representing the current position and posture of the vehicle 100. For example, the positioning information receiver 120 can be a Global Positioning System (GPS) receiver. Each time the positioning information receiver 120 receives the positioning information, the positioning information receiver 120 outputs the acquired positioning information to the ECU 150 via the in-vehicle network.

The vehicle control device 130 involves various devices related to vehicle control including devices such as a drive device including an internal combustion engine or an electric motor serving as a drive source for driving the vehicle 100, a braking device for braking the vehicle 100, a steering device for turning the vehicle 100, and the like. When the drive source for driving the vehicle 100 is an electric motor, the vehicle control device 130 may include a battery for storing electric power, a fuel cell for supplying electric power to the electric motor, and the like. In the present embodiment, vehicle control is a concept that includes general control related to the vehicle 100 in addition to directly controlling the vehicle 100 by the above devices, and includes, for example, control that is indirectly related to driving the vehicle 100 such as control of an air conditioner, a display device, and a sound device.

The wireless terminal 140 includes, for example, an antenna and a signal processing circuit that executes various processes related to wireless communication such as modulation and demodulation of wireless signals. The wireless terminal 140 receives downlink wireless signals from the radio base station 400, and also transmits uplink wireless signals to the radio base station 400. That is, the wireless terminal 140 extracts a signal (for example, a learned model) transmitted from the server 200 to the vehicle 100 from the downlink wireless signals received from the radio base station 400 and passes the signal to the ECU 150. Further, the wireless terminal 140 generates an uplink wireless signal including a signal (for example, a learning data set, specification information, etc.) to be transmitted to the server 200, which is received from the ECU 150, and transmits the wireless signal.

The ECU 150 is a mode of a control device for the vehicle, and includes a processor 152, a memory 154, and a communication interface 156. The processor 152 has one or more central processing units (CPUs) and peripheral circuits thereof. The processor 152 may further include other arithmetic circuits such as a logical operation unit, a numerical operation unit, or a graphic processing unit. The memory 154 includes, for example, a volatile semiconductor memory and a non-volatile semiconductor memory. The memory 154 stores various types of information such as the specification information of the ECU 150 and the learned model provided by the server 200. The communication interface 156 has an interface circuit for connecting the ECU 150 to the in-vehicle network.

The environmental information acquisition sensor 160 is a sensor that mainly acquires information representing the environment around the vehicle 100 (hereinafter, also referred to as environmental information). The environmental information acquisition sensor 160 includes an outside air temperature sensor, an illuminance sensor that detects the illuminance outside the vehicle 100, a rainfall sensor that detects the amount of rainfall outside the vehicle 100, a Light Detection and Ranging (LiDAR) sensor, and the like. The environmental information acquisition sensor 160 outputs the acquired environmental information to the ECU 150 via the in-vehicle network.

The driving state information acquisition sensor 170 is a sensor that acquires various types of information related to the driving state of the vehicle 100 (hereinafter, also referred to as driving state information), and includes an accelerator operation amount sensor that detects the operation amount of the accelerator pedal, a sensor that detects depressing of the brake pedal (brake hydraulic sensor), a steering angle sensor that detects the steering angle of the steering wheel, a vehicle speed sensor that detects the vehicle speed, an acceleration sensor, a gyro sensor, and the like.

When the vehicle 100 employs an internal combustion engine as a drive source, the driving state information acquisition sensor 170 may include various sensors that detect the operating state of the internal combustion engine such as an intake air amount sensor (air flow meter), a pressure sensor and a temperature sensor that detect the pressure and the temperature of the intake air, an exhaust temperature sensor, an air-fuel ratio sensor that detects the air-fuel ratio of the exhaust gas, a hydrocarbon (HC) concentration sensor that detects the HC concentration in the exhaust gas, a carbon monoxide (CO) concentration sensor that detects the CO concentration in the exhaust gas, a temperature sensor that detects the temperature of the exhaust reduction catalyst, a crank angle sensor that detects the rotation angle of the crank shaft, and a coolant temperature sensor that detects the coolant temperature of the internal combustion engine.

Further, when the vehicle 100 employs an electric motor as a drive source, the driving state information acquisition sensor 170 may include various sensors that detect the operating state of the electric motor, such as a sensor that detects the current value and the voltage value of the electric motor. Further, when the electric motor is driven by the electric power generated by the fuel cell, the driving state information acquisition sensor 170 may include various sensors that detect the operating state of the fuel cell, such as a voltage sensor that detects the cell voltage of the fuel cell, a pressure sensor that detects the anode gas pressure, and a sensor that detects the cathode gas flow rate.

Figure 3:
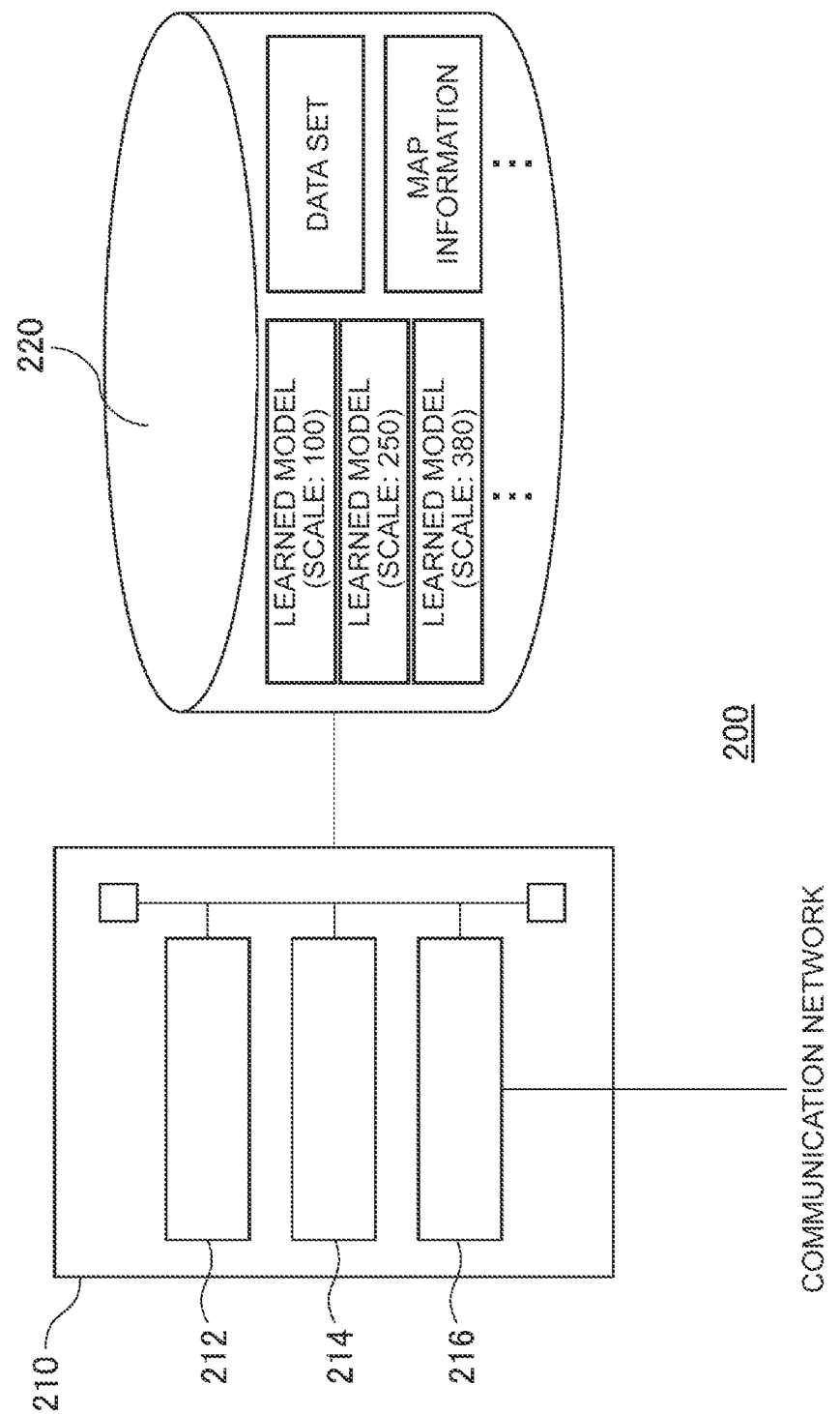
FIG. 3 is a schematic diagram showing a configuration of a server.

FIG. 3 is a schematic diagram showing a configuration of the server 200. The server 200 has a control device 210 and a storage device 220.

The control device 210 includes a processor 212, a memory 214, and a communication interface 216. The processor 212 has one or more CPUs and peripheral circuits thereof. The processor 212 may further include other arithmetic circuits such as a logical operation unit, a numerical operation unit, or a graphic processing unit. The memory 214 includes, for example, a volatile semiconductor memory and a non-volatile semiconductor memory. The communication interface 216 has an interface circuit for connecting the control device 210 to the network in the server 200 or the communication network 300. The communication interface 216 is configured to be communicable with the vehicle 100 via the communication network 300 and the radio base station 400. That is, the communication interface 216 passes the learning data set, the specification information, and the like received from the vehicle 100 via the radio base station 400 and the communication network 300 to the processor 212. Further, the communication interface 216 transmits the learned model received from the processor 212 to the vehicle 100 via the communication network 300 and the radio base station 400.

The storage device 220 includes, for example, a hard disk device or an optical recording medium and an access device thereof. The storage device 220 stores a plurality of learned models of different scales acquired by performing learning by the server 200 using the learning data set. Further, the storage device 220 stores the learning data set transmitted from the vehicle 100 as necessary. Further, as will be described later, the storage device 220 stores the map information, and stores the learned models in association with each region on the map information. The storage device 220 may store a computer program for executing a process executed on the processor 212.

Figure 4:
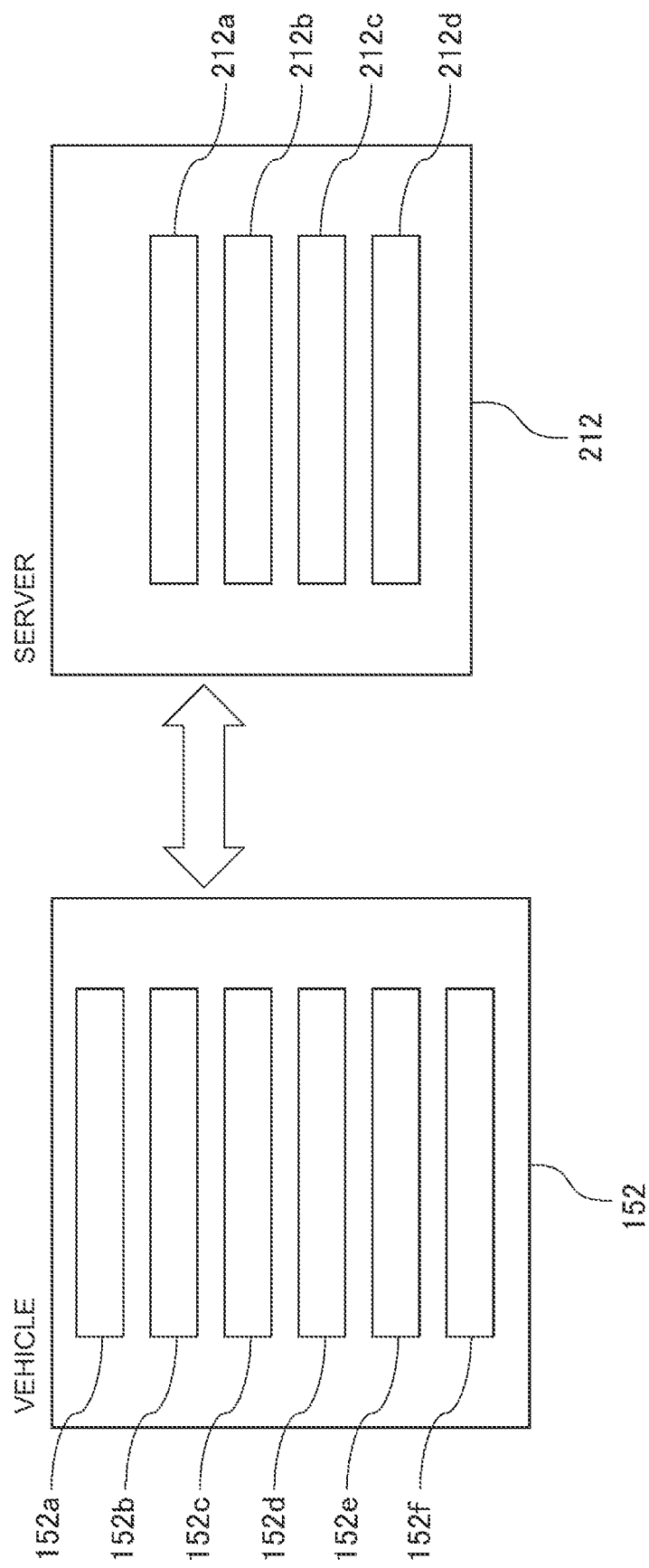
FIG. 4 is a schematic diagram showing both functional blocks of a processor of an electronic control unit (ECU) provided in the vehicle and functional blocks of a processor of a control device provided in the server.

FIG. 4 is a schematic diagram showing both functional blocks of the processor 152 of the ECU 150 provided in the vehicle 100 and functional blocks of the processor 212 of the control device 210 provided in the server 200.

The processor 152 of the ECU 150 includes a data acquisition unit 152a, a data set creation unit 152b, a specification information acquisition unit 152c, a vehicle control unit 152d, a transmission unit 152e, and a reception unit 152f. Each of these units of the processor 152 is, for example, a functional module realized by a computer program that runs on the processor 152. That is, each of these units of the processor 152 is composed of the processor 152 and a program (software) for operating the processor 152. Further, the program may be recorded in the memory 154 included in the ECU 150 or a recording medium connected from the outside. Alternatively, each of these units of the processor 152 may be a dedicated arithmetic circuit provided in the processor 152.

The data acquisition unit 152a of the processor 152 acquires the image generated by the in-vehicle camera 110, the positioning information acquired by the positioning information receiver 120, the environmental information acquired by the environmental information acquisition sensor 160, and the driving state information acquired by the driving state information acquisition sensor 170, and the like.

Further, the data acquisition unit 152a acquires various data based on the image generated by the in-vehicle camera 110, the environmental information, or the driving state information. For example, the data acquisition unit 152a recognizes the image generated every imaging cycle described above by the in-vehicle camera 110 (including recognition by machine learning) to acquire determination values of information such as the road surface condition of the road surface on which the vehicle 100 travels, structures around the vehicle 100, another vehicle traveling around the vehicle 100, or a weather condition. In addition, the data acquisition unit 152a acquires point cloud data indicating an object existing around the vehicle 100 by processing the information acquired by scanning the LiDAR. Further, the data acquisition unit 152a acquires various data by processing the driving state information, for example, by calculating the engine speed based on the output signal of the crank angle sensor. In this way, the data acquisition unit 152a can acquire various data based on the image, the environmental information, or the driving state information by performing predetermined processes on the image, the environmental information, or the driving state information.

Further, the data acquisition unit 152a acquires control values (command values) to be used by the ECU 150 when the ECU 150 controls the vehicle. When the vehicle 100 employs an internal combustion engine as a drive source, these control values may include, for example, ignition timing, fuel injection amount, fuel injection timing, variable valve timing (VVT), the control amount of the exhaust gas recirculation (EGR) valve for adjusting the gas flow rate of the EGR device, and the like. Further, when the vehicle 100 employs an electric motor as a drive source, these control values may include, for example, a current value, a voltage value, and the like of the electric motor. When the electric motor is driven by the electric power generated by the fuel cell, these control values may include the current value supplied from the fuel cell to the electric motor, the unit cell voltage, the anode gas pressure, the cathode gas flow rate, the number of revolutions of the compressor that compresses the cathode gas, the instruction value for controlling various valves provided in the flow path of the anode gas or the cathode gas, and the like. Further, these control values may include control values for systems that support the driving of drivers such as anti-lock braking system (ABS), vehicle stability control system (VSC), and traction control system (TRC). Further, these control values may include control values that are indirectly related to vehicle control, such as the control value indicating the operating state of the wiper of the vehicle 100, the set value of the instruction signal of the headlamp (the set value indicating either the high beam or the low beam, and the like), and the set value for controlling the air conditioner in the vehicle cabin (the set value indicating air volume, set temperature, mode, and the like). In the following, these control values used by the ECU 150 when the ECU 150 controls the vehicle 100 will be referred to as "the control value of the ECU 150".

It should be noted that the data acquisition unit 152*a* does not need to acquire all of the above-mentioned information, and the data acquisition unit 152*a* may acquire only the information necessary for creating the data set in accordance with the learning data set created by the data set creation unit 152*b*.

The data set creation unit 152*b* of the processor 152 creates a learning data set to be used for learning of the server 200 by combining various data acquired by the data acquisition unit 152*a*.

The data set created by the data set creation unit 152*b* differs depending on the content to be learned on the server 200 side. For example, when predicting the temperature of the exhaust reduction catalyst as in JP 2019-183698 A described above, a data set is created mainly based on the driving state information. Further, for example, when learning is performed by associating the environment around the road on which the vehicle 100 travels with the driving state of the vehicle 100, a data set may be created based on the environmental information, the driving state information, and the control value of the ECU 150. Further, for example, when learning is performed by associating the image generated by the in-vehicle camera 110 with the driving state of the vehicle 100, a data set may be created based on the image generated by the in-vehicle camera 110, the driving state information, and the control value of the ECU 150. An example of the learning data set will be described later.

The specification information acquisition unit 152*c* of the processor 152 acquires the specification information of the in-vehicle computer provided in the vehicle 100, that is, the specification information of the ECU 150. The specification information of the ECU 150 is stored in advance in the memory 154 of the ECU 150. The specification information is information representing the computing power of the ECU 150, including, for example, the clock frequency of the processor 152, the number of cores, the capacity of the memory 154, and the like.

The vehicle control unit 152*d* of the processor 152 controls the vehicle 100 by performing processes to which the learned model transmitted from the server 200 is applied. For example, the vehicle control unit 152*d* inputs various data based on the image of the in-vehicle camera 110, the environmental information, the driving state information, or the control value of the ECU 150 into the learned model as input values to acquire an output value from the learned model, thereby performing vehicle control based on the output value.

The transmission unit 152*e* of the processor 152 is one mode of a computing power information transmission unit, and transmits the specification information acquired by the specification information acquisition unit 152*c* to the server 200. Further, the transmission unit 152*e* is one mode of a learning data set transmission unit, and transmits the learning data set created by the data set creation unit 152*b* to the server 200. The reception unit 152*f* of the processor 152 is one mode of a learned model reception unit, and receives the learned model of a scale corresponding to the computing power of the ECU 150 from the server 200.

The processor 212 of the control device 210 provided in the server 200 includes a model scale determination unit 212*a*, a learning unit 212*b*, a transmission unit 212*c*, and a reception unit 212*d*. Each of these units of the processor 212 is, for example, a functional module realized by a computer program that runs on the processor 212. That is, each of these units of the processor 212 is composed of the processor 212 and a program (software) for operating the processor 212. Further, the program may be recorded in the memory 214 included in the control device 210, the storage device 220, or a recording medium connected from the outside. Alternatively, each of these units included in the processor 212 may be a dedicated arithmetic circuit provided in the processor 212.

The model scale determination unit 212*a* of the processor 212 determines the scale of the learned model based on the specification information transmitted from the ECU 150 of the vehicle 100. For example, the model scale determination unit 212*a* determines the scale of the learned model based on a map in which the relationship between the computing power of the ECU 150 of the vehicle 100 represented by the specification information and the scale of the learned model is defined in advance.

Figures 5, 6:
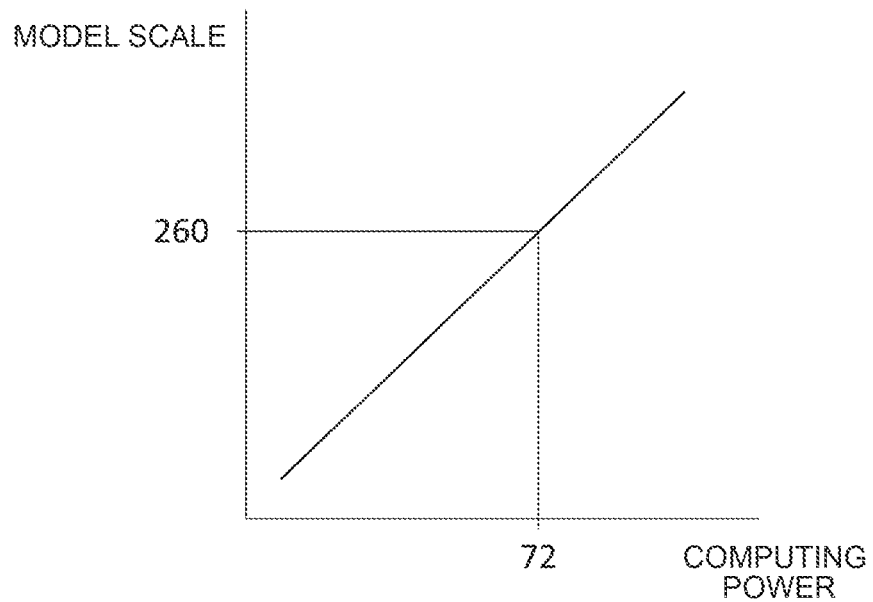
FIG. 5 is a schematic diagram showing a map defining in advance the relationship between computing power of the ECU and the scale of a learned model.
FIG. 6 is a schematic diagram showing a table used by a model scale determination unit to obtain the computing power from specification information of the ECU.

FIG. 5 is a schematic diagram showing an example of a map defining in advance the relationship between the computing power of the ECU 150 and the scale of the learned model. In FIG. 5, both the computing power of the ECU 150 and the scale of the learned model are quantified and shown. The larger the numerical value is, the higher the computing power of the ECU 150 is and the larger the scale of the learned model is. In the map shown in FIG. 5, the relationship between the computing power of the ECU 150 and the scale of the learned model is defined in advance so that the higher the computing power of the ECU 150 is, the larger the scale of the learned model is. The model scale determination unit 212*a* determines the scale of the learned model by applying the computing power of the ECU 150 obtained from the specification information to the map of FIG. 5.

FIG. 6 is a schematic diagram showing an example of a table used by the model scale determination unit 212*a* to obtain the computing power from the specification information of the ECU 150. As shown in FIG. 6, the computing power of the ECU 150 is quantified based on the clock frequency of the processor 152, the number of cores, and the capacity of the memory 154. The higher the numerical values of the clock frequency, the number of cores, and the memory capacity are, the higher the numerical value of the computing power is, and thus the higher the computing power is. In the example shown in FIG. 6, as an example, the computing power is a value obtained by multiplying the clock frequency, the number of cores, and the memory capacity, which is represented by the following formula: (computing power)=(clock frequency)×(number of cores)×(memory capacity). In the four types of examples of the ECU 150 (ECU_A, ECU_B, ECU_C, and ECU_D) shown in FIG. 6, the computing power of the ECU_C, which has the maximum clock frequency, the number of cores, and the memory capacity, is the highest. The numerical values of the clock frequency, the number of cores, and the memory capacity shown in FIG. 6 are examples.

For example, when the specification information transmitted from a certain vehicle 100 corresponds to the ECU_A shown in FIG. 6, the model scale determination unit 212*a* determines from the table of FIG. 6 that the computing power of the ECU 150 of the vehicle 100 is "72". Then, the model scale determination unit 212*a* determines that the scale of the learned model corresponding to the computing power of the ECU 150 is, for example, "260" based on the map of FIG. 5. Therefore, when a learned model of a scale of "260" or less is provided, the vehicle 100 can perform vehicle control by applying the learned model. The numerical value of the computing power of the ECU 150, the numerical value of the scale of the learned model, and the relationship therebetween shown in FIG. 5 are examples, and the present embodiment is not limited thereto.

Instead of the table shown in FIG. 6, the computing power may be calculated based on a map or a function that defines the relationship between the computing power and parameters such as the clock frequency, the number of cores, and the memory capacity. FIG. 6 shows an example in which the computing power of the ECU 150 can be obtained based on the clock frequency, the number of cores, and the memory capacity. Alternatively, for example, the computing power of the ECU 150 can be obtained based on, for example, other specifications such as the amount of data that can be transmitted by the communication interface 156 in addition to the above parameters.

Figure 7:
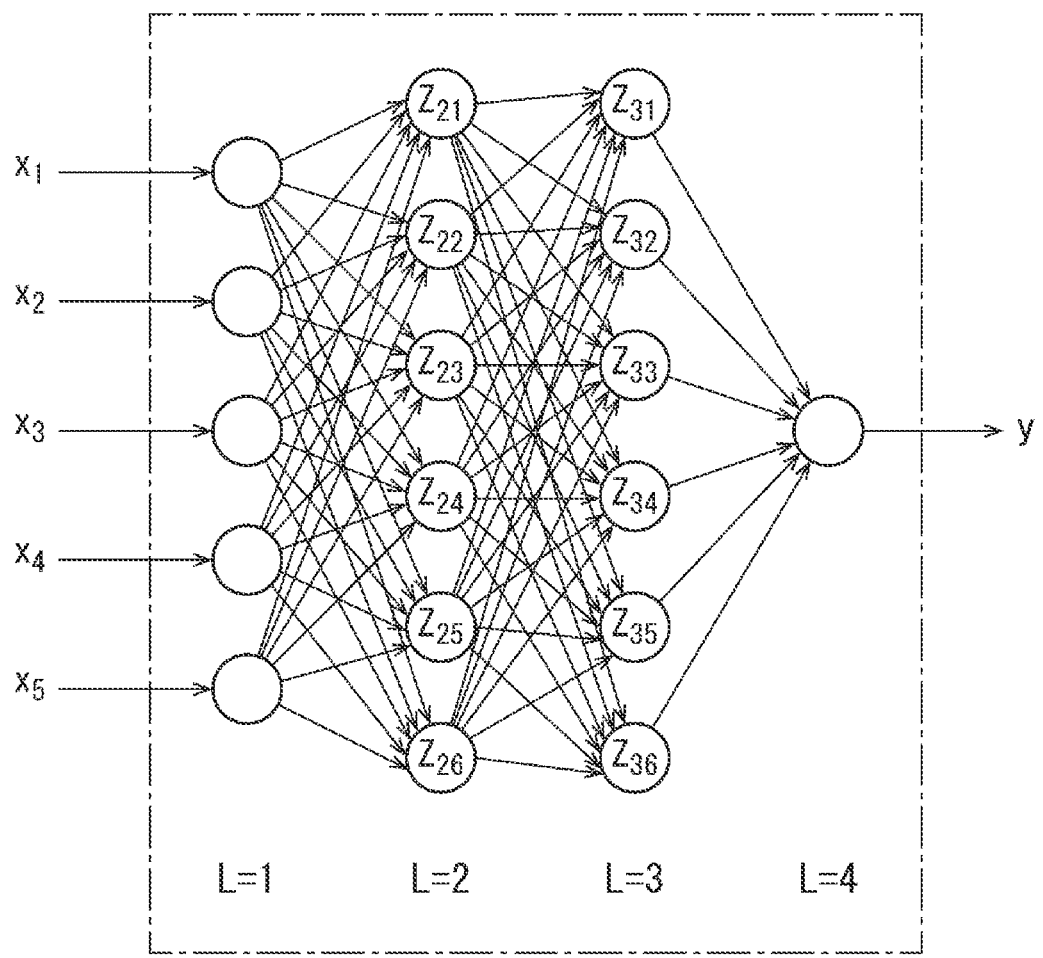
FIG. 7 is a schematic diagram showing an example of a neural network used by a learning unit that performs learning based on a data set to create the learned model.

The learning unit 212*b* of the processor 212 uses a neural network in accordance with the scale of the learned model determined by the model scale determination unit 212*a*, and performs learning based on the learning data set transmitted from the vehicle 100. FIG. 7 is a schematic diagram showing an example of a neural network in which the learning unit 212*b* performs learning based on a learning data set and creates a learned model. The neural network shown in FIG. 7 has the same configuration as that described in JP 2019-183698 A, and since the neural network itself is already known, an outline will be described here. The circles in FIG. 7 represent artificial neurons, and in neural networks, these artificial neurons are usually referred to as nodes or units (here, referred to as nodes). In FIG. 7, L=1 indicates an input layer, L=2 and L=3 indicate hidden layers, and L=4 indicates an output layer. As shown in FIG. 7, the input layer (L=1) consists of five nodes, and the input values $x_1$, $x_2$, $x_3$, $x_4$, and $x_5$ are input to the nodes of the input layer (L=1). FIG. 7 schematically shows two hidden layers, a hidden layer (L=2) and a hidden layer (L=3), each having six nodes. However, the number of layers of these hidden layers may be one or any number, and the number of nodes existing in these hidden layers may also be any number. In the present embodiment, the number of hidden layers and the number of nodes in the hidden layers are determined according to the scale of the learned model determined by the model scale determination unit 212*a*. $z_{21}$, $z_{22}$, $z_{23}$, $z_{24}$, $z_{25}$, and $z_{26}$ indicate the output values from each node of the hidden layer (L=2), and $z_{31}$, $z_{32}$, $z_{33}$, $z_{34}$, $z_{35}$, and $z_{36}$ indicate the output values from each node of the hidden layer (L=3). The number of nodes in the output layer (L=4) is one, and the output value from the node in the output layer is indicated by y.

At each node of the input layer (L=1), the input values $x_1$, $x_2$, $x_3$, $x_4$, and $x_5$ are output as they are. The output values $x_1$, $x_2$, $x_3$, $x_4$, and $x_5$ of each node of the input layer are input to each node of the hidden layer (L=2), and in each node of the hidden layer (L=2), the total input value $u_{2k}=\Sigma x \cdot w + b$ (k=1 to 6) is calculated using the corresponding weight w and bias b.

Next, this total input value $u_{2k}$ is converted by the activation function f, and is output as an output value $z_{2k}$ ($=f(u_{2k})$) from each node represented by $z_{2k}$ of the hidden layer (L=2). The output values $z_{21}$, $z_{22}$, $z_{23}$, $z_{24}$, $z_{25}$, and $z_{26}$ of each node of the hidden layer (L=2) are input to each node of the hidden layer (L=3), and in each node of the hidden layer (L=3), the total input value $u_{3k}=\Sigma z \cdot w + b$ (k=1 to 6) is calculated using the corresponding weight w and bias b. This total input value $u_{3k}$ is similarly converted by the activation function and output as output values $z_{31}$, $z_{32}$, $z_{33}$, $z_{34}$, $z_{35}$, and $z_{36}$ from each node of the hidden layer (L=3). As the activation function, for example, a sigmoid function $\sigma(x)=1/(1+\exp(-x))$, a rectified linear function (ReLU)$S(u)=\max(0, u)$, or the like is used.

The output values $z_{31}$, $z_{32}$, $z_{33}$, $z_{34}$, $z_{35}$, and $z_{36}$ of each node of the hidden layer (L=3) are input to the node of the output layer (L=4). In the node of the output layer, the total input value $u_{4k}=\Sigma z \cdot w + b$ is calculated using the corresponding weight w and bias b, or the total input value $u_{4k}=\Sigma z \cdot w$ is calculated using only the corresponding weight w. In this example, the identity function is used at the node of the output layer, and the total input value $u_{4k}$ calculated in the node of the output layer is output as it is as the output value y from the node of the output layer. The number of nodes in the output layer may be two or more.

One data set created by the data set creation unit 152*b* includes input values $x_1$, $x_2$, $x_3$, $x_4$, and $x_5$ and teacher data $y_t$ for the input values $x_1$, $x_2$, $x_3$, $x_4$, and $x_5$. In the case where the teacher data $y_t$ is obtained for a certain input value, and the output value from the output layer (L=4) for this input value is y, when the square error is used as an error function, the square error E is obtained by $E=(1/2) \cdot (y-y_t)^2$.

The learning unit 212*b* inputs the input values included in the data set transmitted from the vehicle 100 to the neural network, and calculates the square error E from the obtained output value y and the teacher data $y_t$ included in the data set. Then, in order to minimize the sum of the square errors E obtained from the plurality of learning data sets, the learning unit 212*b* performs operations such as an error back propagation method and a stochastic gradient descent method to calculate the weight w and the bias b for each node and create the learned model. When the teacher data cannot be detected on the vehicle 100 side, the learning unit 212*b* may create a learned model by unsupervised learning or reinforcement learning.

At this time, the learning unit 212*b* prepares a plurality of neural networks having a different number of hidden layers and a different number of nodes existing in the hidden layers, and performs learning with each neural network to create learned models of different scales. As a result, even when a plurality of learning data sets are the same, learned models of different scales can be obtained. The learned models created by the learning unit 212*b* are transmitted to the vehicle 100. Further, the learned models created by the learning unit 212*b* are stored in the storage device 220. Note that FIG. 3 shows a case where the learned models of different scales are accumulated in the storage device 220. The values of the scale of the learned models shown in FIG. 3 are examples, and the present embodiment is not limited thereto.

The transmission unit 212*c* of the processor 212 is one mode of a learned model transmission unit, and transmits the learned model created by the learning unit 212*b* to the vehicle 100. Specifically, the transmission unit 212c transmits information required for performing vehicle control to which the ECU 150 of the vehicle 100 applies the learned model, such as the values of the weight w and bias b of each node of the neural network of the learned model, and the configuration of the neural network (the number of layers, the number of nodes, etc.). At this time, the transmission unit 212c transmits a learned model of a larger scale for a vehicle 100 equipped with an ECU 150 having a higher computing power.

The reception unit 212d of the processor 212 is one mode of a learning data set reception unit, and receives the learning data set transmitted from the ECU 150 of the vehicle 100. Further, the reception unit 212d is one mode of a computing power information reception unit, and receives information on the computing power of the ECU 150 of the vehicle 100.

In the configuration shown in FIG. 4, the processes performed by the data acquisition unit 152a and the data set creation unit 152b of the processor 152 of the ECU 150 may be performed by the processor 212 of the control device 210 of the server 200. In this case, raw data such as the image generated by the in-vehicle camera 110, the positioning information acquired by the positioning information receiver 120, the environmental information acquired by the environmental information acquisition sensor 160, and the driving state information acquired by the driving state information acquisition sensor 170 is transmitted to the server 200, and the processor 212 of the control device 210 on the server 200 side performs the processes instead of the data acquisition unit 152a and the data set creation unit 152b.

Figure 8:
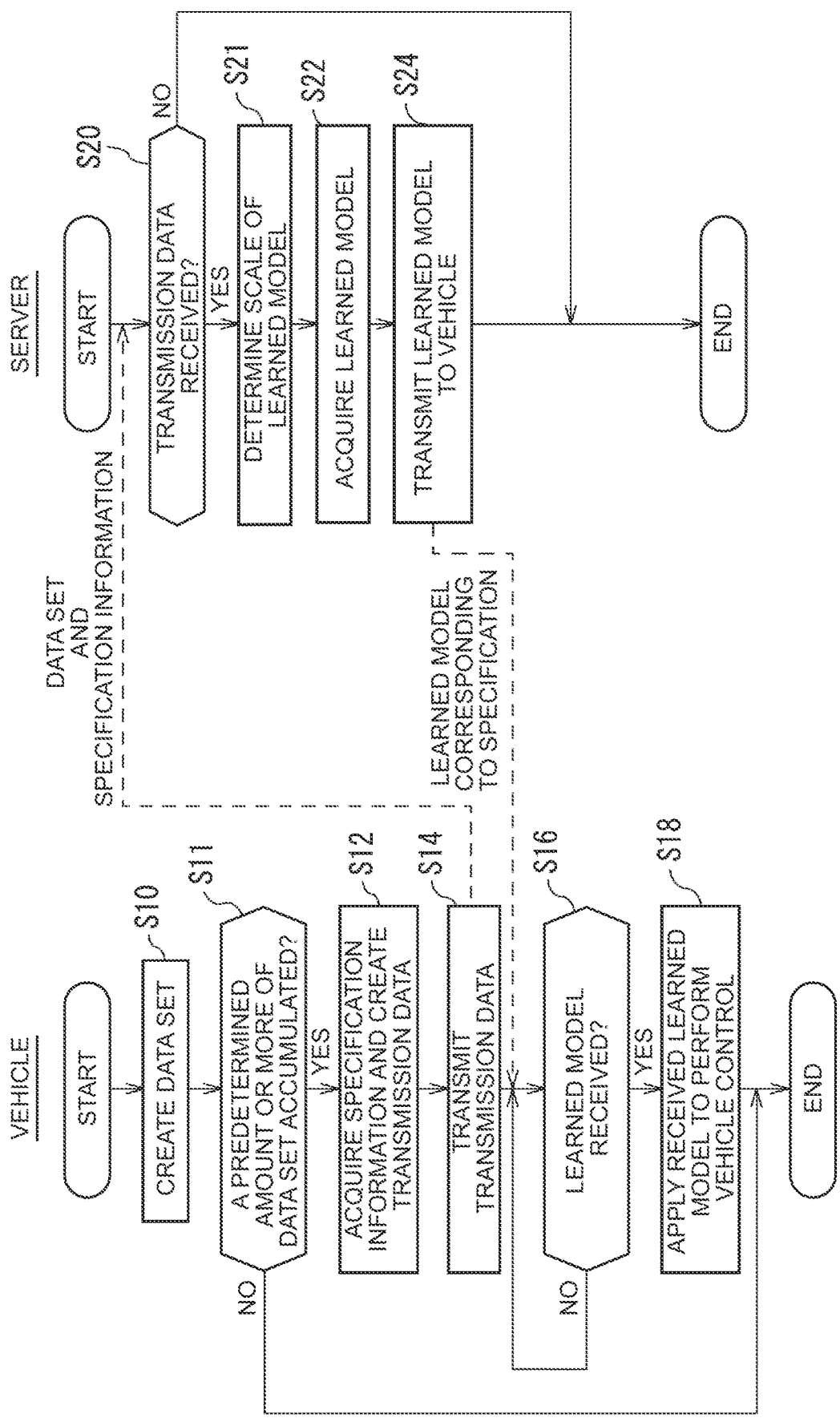
FIG. 8 is a sequence diagram showing processes performed by the ECU provided in the vehicle and the control device provided in the server.

Next, the processes performed by the ECU 150 provided in the vehicle 100 and the control device 210 provided in the server 200 will be described with reference to the sequence diagram of FIG. 8. In FIG. 8, the processes on the vehicle 100 side are performed by the ECU 150 provided in the vehicle 100 at predetermined control cycles. Further, the processes on the server 200 side are performed by the control device 210 provided in the server 200 at predetermined control cycles.

First, on the vehicle 100 side, the data set creation unit 152b of the processor 152 creates a learning data set from the data acquired by the data acquisition unit 152a (step S10). Next, the data set creation unit 152b determines whether a predetermined amount or more of the data set is accumulated (step S11). When a predetermined amount or more of the data set is accumulated in step S11, the specification information acquisition unit 152c acquires the specification information, and the specification information and the learning data set are combined to create transmission data (step S12). On the other hand, when a predetermined amount or more of the data set is not accumulated in step S11, the processes in this control cycle end. In addition to the specification information and the learning data set, the transmission data may include vehicle identification information (vehicle ID) for identifying each vehicle 100, the positioning information acquired by the positioning information receiver 120, and the like. In particular, when a learned model is created for each region in which the vehicle 100 travels as described later, the transmission data may include the positioning information. Next, the transmission unit 152e of the processor 152 transmits the transmission data to the server 200 (step S14).

When the server 200 performs learning based on the learning data sets created by a plurality of vehicles 100, the learning data sets are also transmitted from other vehicles 100 to the server 200, so the transmission data may be created without performing the process of step S11. On the other hand, when the server 200 performs learning based only on the learning data set created by one specific vehicle 100, a predetermined amount or more of the data set is required for the server 200 to perform the learning, so the process of S11 may be performed.

Further, when the server 200 performs learning based on the learning data sets created by a plurality of vehicles 100, the server 200 can perform learning based on the learning data sets acquired from the other vehicles 100. Therefore, in this case, the transmission data created in step S12 need not include the learning data set.

On the server 200 side, it is determined whether the reception unit 212d of the processor 212 has received the transmission data transmitted from the vehicle 100 (step S20), and when the transmission data is received, the model scale determination unit 212a determines the scale of the learned model based on the specification information transmitted from the ECU 150 of the vehicle 100 (step S21). The model scale determination unit 212a applies the specification information included in the transmission data received from the vehicle 100 side to the table shown in FIG. 6, or a map or function that defines the relationship between the computing power and the parameters such as the clock frequency, the number of cores, and the memory capacity to obtain the computing power of the ECU 150 of the vehicle 100. In the model scale determination unit 212a, when the vehicle identification information and the type of the ECU 150 (for example, the types such as the ECU_A to the ECU_D shown in FIG. 6) are associated in advance and the type of the ECU 150 can be determined from the vehicle identification information, the computing power of the ECU 150 may be obtained by applying the type of the ECU 150 obtained from the vehicle identification information to the table of FIG. 6. Therefore, the vehicle identification information is one mode of information regarding the computing power of the ECU 150. The model scale determination unit 212a applies the obtained computing power of the ECU 150 to the map of FIG. 5 to obtain the scale of the learned model. When the transmission data is not received in step S20, the processes in this control cycle end.

After step S21, in step S22, the learned model corresponding to the scale determined in step S21 is acquired (step S22). More specifically, in step S22, the learning unit 212b of the processor 212 performs learning using the learning data set to create a learned model of a scale corresponding to the computing power of the ECU 150. Alternatively, in step S22, a learned model of a scale corresponding to the computing power of the ECU 150 is selected from the learned models that have already been created and stored in the storage device 220.

When the learning unit 212b creates a learned model of a scale corresponding to the computing power of the ECU 150, the learning unit 212b learns the data set by a neural network having the number of hidden layers and the number of nodes corresponding to the scale of the learned model determined by the model scale determination unit 212a in step S21 to create a learned model. As a result, a learned model of a scale corresponding to the computing power of the ECU 150 is acquired.

Further, when selecting a learned model of a scale corresponding to the computing power of the ECU 150 from the learned models stored in the storage device 220, a learned model is selected corresponding to the scale determined by the model scale determination unit 212a in step S21 from the learned models that have been already created. When a learned model is created for each region in which the vehicle 100 travels as described later, a learned model for the region corresponding to the position information of the vehicle 100 is selected from the learned models that have already been created.

Next, the transmission unit 212c of the processor 212 transmits the learned model acquired in step S22 to the vehicle 100 side (step S24). When a learned model is created for each region in which the vehicle 100 travels as described later, the transmission unit 212c transmits a learned model corresponding to the region in which the vehicle 100 currently travels based on the positioning information received from the vehicle 100. After step S24, the processes in this control cycle on the server 200 side end.

In the vehicle 100, it is determined whether the reception unit 152f of the processor 152 has received the learned model (step S16), and when the learned model is received, the vehicle control unit 152d of the processor 152 applies the learned model to perform vehicle control (step S18). When the learned model has not been received in step S16, the process waits in step S16. After step S18, the processes in this control cycle on the vehicle 100 side end.

When the reception unit 152f of the processor 152 receives the learned model in step S16, the received learned model is stored in the memory 154. At this time, when a learned model is already stored in the memory 154, the newly received learned model updates the learned model that has been already stored in the memory 154.

Here, in the present embodiment, updating the learned model not only includes the concept of updating the values of the weight and bias of the learned model, but also includes the concept of changing the number of hidden layers or the number of nodes in the hidden layers of the learned model that has already been stored in the memory 154. That is, updating the learned model includes the concept of changing the configuration of the learned model itself. In other words, the server 200 can provide the vehicle 100 with a learned model having a different number of hidden layers or a different number of nodes in the hidden layers from those of the existing learned model that has already been stored in the memory 154. Further, the server 200 does not need to provide the vehicle 100 with a learned model of the same scale as that of the existing learned model that has already been stored in the memory 154, and can provide the vehicle 100 with a learned model of a scale different from that of the existing learned model within a range that does not exceed the computing power of the ECU 150.

As described above, in the processes of FIG. 8, the processes of step S10 and step S11 may be performed by the control device 210 of the server 200.

Figure 9:
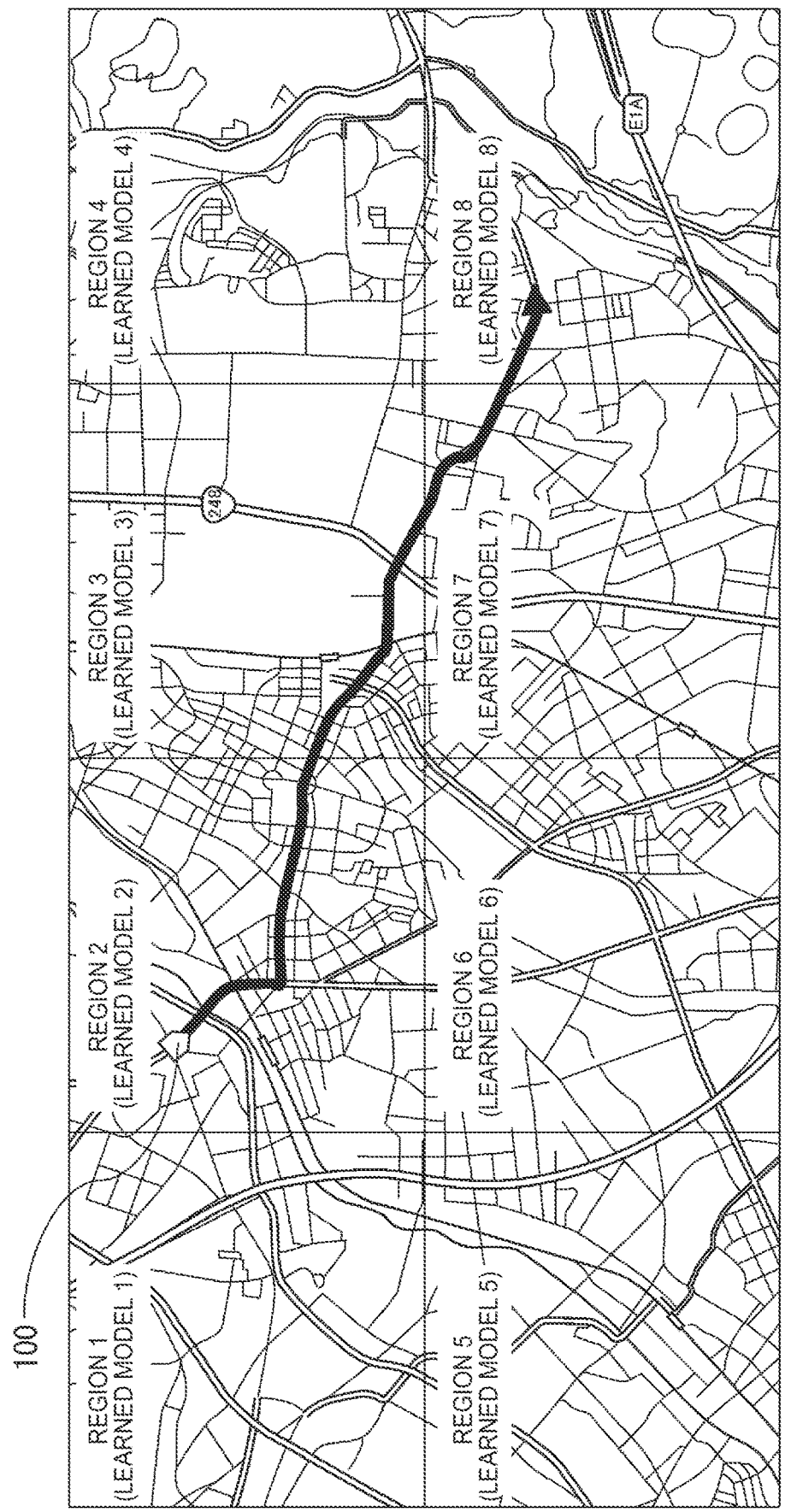
FIG. 9 is a schematic diagram showing an example in which learned models of different scales are associated with regions according to the size of the regions.

Next, a specific example in which the scale of the learned model differs depending on the specification information of the vehicle 100 will be described. Here, as an example, a case where a learned model is created for each region in which the vehicle 100 travels and the scale of the learned model differs depending on the size of the region will be described. FIG. 9 is a schematic diagram showing an example in which a learned model is created for each region in which the vehicle 100 travels. In FIG. 9, a certain range on the map is divided into eight regions, and learned models 1 to 8 are created for each of the eight regions 1 to 8.

The map information shown in FIG. 9 is stored in the storage device 220 shown in FIG. 3 so as to be searchable. The map information is divided into each region shown in FIG. 9, and a learned model is assigned to each region. In the storage device 220, the map information of these regions and the assigned learned models are stored in association with each other. More specifically, in the map information, the regions on the map are divided based on the latitude and longitude to set each region, and a learned model is created for each region and associated with each region.

The learned model corresponding to the region 2 is created by performing learning using a data set created based on the data collected by the vehicle 100 traveling in the region 2. When the vehicle 100 transmits the learning data set to the server 200, the vehicle 100 transmits the positioning information indicating the position where the data set is created, that is, the position where various data included in the data set is collected, to the server 200. As a result, the learning unit 212b of the processor 212 of the control device 210 can determine that the position where the data set is created belongs to the region 2 based on the position information included in the positioning information, so that the data set corresponding to the region 2 can be used to perform learning to create a learned model corresponding to the region 2. Similarly, the server 200 performs learning on the other regions using the data set corresponding to each region to create a learned model corresponding to each region. The learned models created in this way are stored in the storage device 220 in association with each region on the map information.

The transmission unit 212c of the processor 212 transmits the learned models corresponding to each region to the vehicle 100 traveling in the corresponding region based on the position information of the vehicle 100. For example, a learned model 2 corresponding to the region 2 is transmitted to the vehicle 100 traveling in the region 2, and a learned model 3 corresponding to a region 3 is transmitted to the vehicle 100 traveling in the region 3.

By acquiring the learning data sets from the vehicle 100 traveling in regions 1 to 8 by the above method, the server 200 can create learned models 1 to 8 corresponding to each of the regions 1 to 8. Further, the server 200 can provide a learned model corresponding to the region in which the vehicle 100 travels to each of the vehicles 100 traveling in each of the regions 1 to 8.

In FIG. 9, the thick arrow indicates the traveling route of a vehicle 100. The vehicle 100 travels in the order of the region 2, the region 3, region 7, and region 8. When the vehicle 100 moves from the region 2 to the region 3, the vehicle 100 sequentially receives the learned model 2 and the learned model 3 from the server 200 in each region, and sequentially updates the learned model stored in the memory 154.

While the vehicle 100 is moving in the region 2, the learned model suitable for vehicle control is the learned model 2. The learned model 2 is stored in the memory 154, and vehicle control is executed using the learned model 2. After that, when the vehicle 100 moves from the region 2 to the region 3, the server 200 extracts the learned model 3 corresponding to the region 3 from the storage device 220 based on the position information indicating that the current position of the vehicle 100 is in the region 3, and transmits the learned model 3 to the vehicle 100. The vehicle 100 receives the learned model 3 from the server 200 and updates the learned model in the memory 154. The vehicle 100 executes vehicle control using the learned model 3 while traveling in the region 3. After that, the same applies when the vehicle 100 moves from the region 3 to the region 7, and when the vehicle 100 moves from the region 7 to the region 8.

As shown in FIG. 9, various factors such as the density of roads, the number of intersections, and the width of roads are region-dependent and vary from region to region. In addition, factors such as the curvature of the roads, the gradient of the roads, and the traffic amount of other vehicles are also region-dependent and differ from region to region. Since the vehicle 100 traveling in each region can acquire a learned model for the region corresponding to the current traveling position, the learned model corresponding to the current position is applied to perform vehicle control, making it possible to perform optimum vehicle control that suits the factors for each region.

As described above, the larger the scale of the learned model is, the more accurately the model represents the actual state, and thus it is suitable for more sophisticated and precise vehicle control. Even when the learned model is different for each region, the larger the scale of the learned model is, the more accurately the model represents the actual state in the region. Therefore, the vehicle control may be performed by applying the learned model of a larger scale. On the other hand, when a large-scale learned model is provided to all the vehicles 100, the vehicle 100 equipped with the ECU 150 having high computing power can perform vehicle control by applying the large-scale learned model, but the vehicle 100 equipped with the ECU 150 having relatively low computing power cannot perform vehicle control by applying a large-scale learned model.

Therefore, the learning unit 212*b* of the processor 212 of the control device 210 creates a learned model for each region in which the vehicle 100 travels, and a learned model of a larger scale is created as the region is larger. The transmission unit 212*c* of the processor 212 transmits the learned model corresponding to each region in which the vehicle 100 currently travels based on the position information of the vehicle 100. Further, the reception unit 152*f* of the ECU 150 receives a learned model corresponding to the region in which the vehicle 100 currently travels for each region in which the vehicle 100 travels, and a learned model of a larger scale is received as the region is larger.

When the size of the region is small, the amount of information output by the learned model is small in accordance with the size of the region. Therefore, even when the scale of the learned model is reduced, a decrease in the accuracy of vehicle control by applying the learned model is suppressed. Therefore, by creating a small-scale learned model corresponding to a narrower region and providing the model to the vehicle 100, it is possible to perform desired vehicle control by applying the learned model even when the vehicle 100 is equipped with an ECU 150 having relatively low computing power. Note that the smaller the region is, the smaller the number of learning data sets is used to create a learned model.

Figure 10:
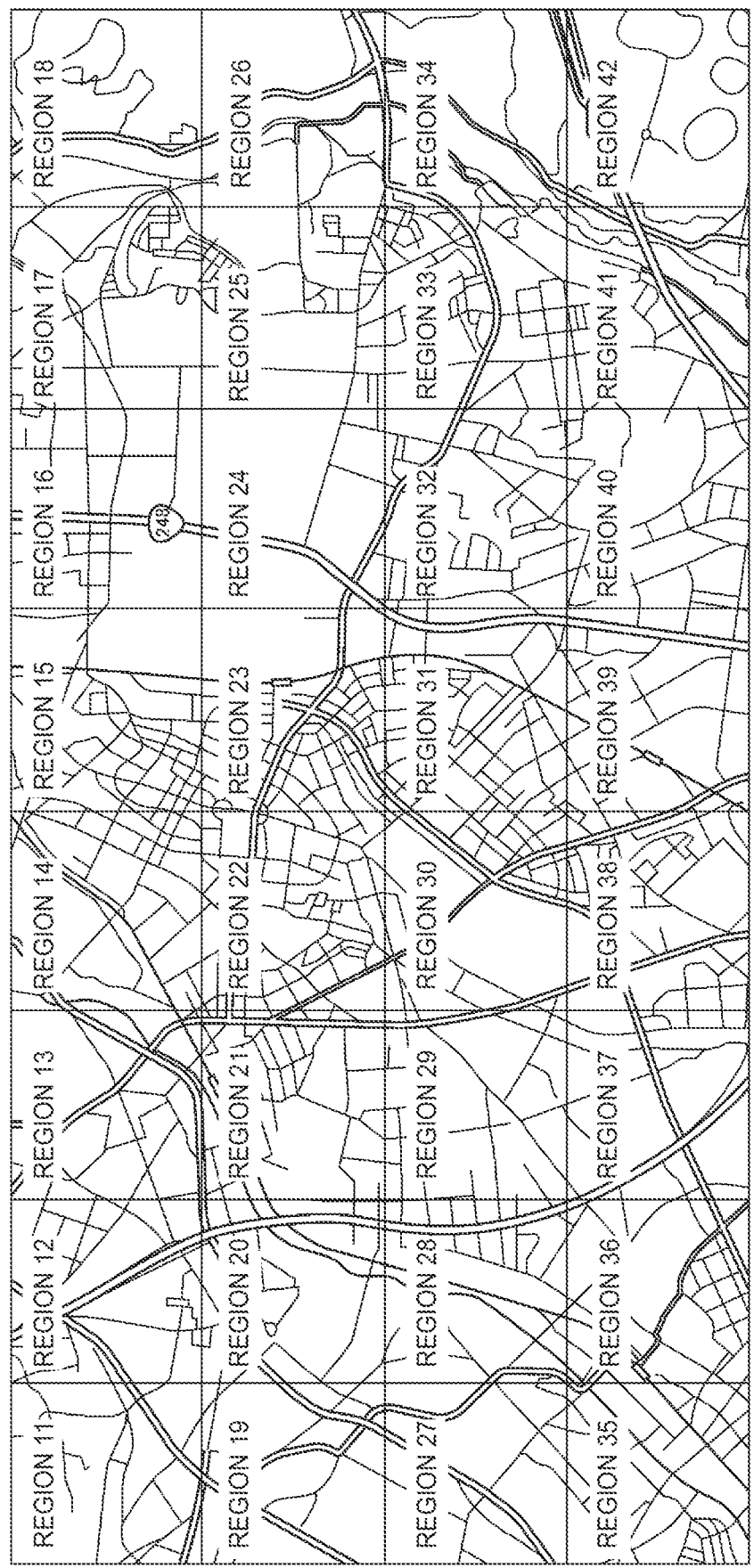
FIG. 10 is a schematic diagram showing an example in which learned models of different scales are associated with regions according to the size of the regions.

FIG. 10 shows an example in which the same range on the map as in FIG. 9 is divided into 32 regions 11 to 42. In the example of FIG. 10, as in FIG. 9, learned models 11 to 42 corresponding to each region 11 to 42 are created. As shown in FIG. 10, by increasing the number of divisions of the regions and narrowing a region corresponding to one learned model, it is possible to make a smaller-scale learned model correspond to each region as compared with FIG. 9.

In the present embodiment, since the learned model of the scale corresponding to the computing power of the ECU 150 is transmitted from the server 200 to the vehicle 100 based on the specification information of the vehicle 100, a small-scale learned model corresponding to a relatively small region as shown in FIG. 10 is transmitted to the vehicle 100 equipped with the ECU 150 having relatively low computing power. The vehicle 100 to which the small-scale learned model is transmitted receives the learned model corresponding to the new region from the server 200 each time the traveling region is switched, and performs vehicle control by applying the learned model corresponding to the new region. As the size of the region becomes narrower, the traveling region is switched more frequently. Therefore, the transmission unit 212*c* of the processor 212 of the control device 210 transmits a learned model to the vehicle 100 equipped with the ECU 150 having low computing power at a higher transmission frequency than to the vehicle 100 equipped with the ECU 150 having high computing power. Further, the reception unit 152*f* of the processor 152 of the ECU 150 receives a learned model with a higher reception frequency as the computing power of the ECU 150 is lower.

As a result, the vehicle 100 equipped with the ECU 150 having relatively low computing power increases the update frequency of the learned model even when a small-scale learned model is used, so that a decrease in the accuracy of the information output by the learned model is suppressed. Thus, it is possible to perform desired vehicle control by applying the learned model. Further, in this case, since the small-scale learned model is transmitted to the vehicle 100, the amount of traffic when transmitting the learned model is suppressed.

Further, for the vehicle 100 equipped with the ECU 150 having relatively high computing power, a large-scale learned model corresponding to a relatively wide region as shown in FIG. 9 is transmitted. The vehicle 100 to which the large-scale learned model is transmitted receives the learned model corresponding to the new region each time the traveling region is switched, and performs vehicle control by applying the learned model corresponding to the new region. At this time, since the learned model corresponds to a relatively wide region, the switching of the traveling region does not occur frequently. Therefore, the vehicle 100 equipped with the ECU 150 having relatively high computing power can perform vehicle control with reduced update frequency of the learned model.

As described above, even in the vehicle 100 equipped with the ECU 150 having low computing power, a small-scale learned model is received from the server 200 every time the region is switched during traveling, and processes are performed while switching the learned models. Thus, it is possible to perform desired vehicle control by applying the learned model by making the best use of the computing power of the ECU 150.

Further, in the vehicle 100 equipped with the ECU 150 having high computing power, highly accurate vehicle control can be performed by applying a large-scale learned model corresponding to a wide region. Further, in the vehicle 100 equipped with the ECU 150 having high computing power, the update frequency of the learned model is low, and thus the processes for updating the learned model are reduced.

Next, a learning data set and an example of a learned model will be described. As described above, the data set creation unit 152*b* of the processor 152 of the vehicle 100 creates a learning data set to be used for learning of the server 200 by combining various data acquired by the data acquisition unit 152*a*. The learning data set created by the data set creation unit 152*b* differs depending on the content to be learned on the server 200 side.

An example of the learned model includes a learned model using ignition timing, fuel injection amount, injection timing, throttle opening degree, variable valve timing, control amount of EGR valve that adjusts the gas flow rate of the exhaust gas recirculation device, position information of the vehicle 100, and weather information as the input values and "NOx emission amount" as the output value y. In this case, the learning data set consists of the fuel injection amount, the injection timing, the throttle opening degree, the variable valve timing, the control amount of the EGR valve that adjusts the gas flow rate of the exhaust gas recirculation device, the position information of the vehicle 100, and the weather information, and the NOx emission amount as the teacher data $y_t$. By performing processes applying this learned model, the ECU 150 of the vehicle 100 can calculate the NOx emission amount, which is an output value, based on the input values that change from moment to moment. In particular, since the input values include the position information of the vehicle 100 and the weather information, the ECU 150 can calculate the NOx emission amount based on the position where the vehicle 100 travels and the weather. Therefore, vehicle control based on the NOx emission amount is realized with high accuracy.

Further, as described with reference to FIG. 9, when a learned model is created for each region in which the vehicle 100 travels, the learned model for the region corresponding to the position in which the vehicle 100 travels is provided to the vehicle 100. As a result, the ECU 150 of the vehicle 100 applies a learned model specialized for the region corresponding to the position where the vehicle 100 travels to perform processes, so that the NOx emission amount can be calculated more accurately, and vehicle control based on the NOx emission amount is realized with higher accuracy.

Further, another example of the learned model includes a learned model using point cloud data indicating an object existing around the vehicle 100 acquired by an image generated by the in-vehicle camera 110 or by scanning the LiDAR when the vehicle 100 travels on a certain movement path as the input values and the driving state of the vehicle 100 or the control value of the ECU 150 when the image or the point cloud data is generated as the output value. The driving state here includes, for example, operating states such as the steering angle of the steering wheel, the accelerator operation amount, and the brake hydraulic pressure. In this case, the learning data set consists of the image and the point cloud data, and the driving state or the control value of the ECU 150 as the teacher data $y_t$. According to this learned model, the operation and the control that are performed on the vehicle 100 according to the situation around the vehicle 100 indicated by the image or the point cloud data are learned. Therefore, since the operation amount for the vehicle 100 or the control value of the ECU 150 is calculated as the output value based on the image or the point cloud data that is the input value, it is possible to perform autonomous driving based on the image generated by the in-vehicle camera 110 and the point cloud data obtained by scanning the LiDAR, particularly on the vehicle 100 that performs autonomous driving.

Further, as described with reference to FIG. 9, when a learned model is created for each region in which the vehicle 100 travels, the learned model for the region corresponding to the position in which the vehicle 100 travels is provided to the vehicle 100. As a result, the ECU 150 of the vehicle 100 applies a learned model specialized for the region corresponding to the position where the vehicle 100 travels to perform processes. Therefore, the operation amount for the vehicle 100 or the control value of the ECU 150 can be calculated more accurately based on the image that is the input value, so that vehicle control based on the operation amount or the control value of the ECU 150 can be realized with higher accuracy.

In the present embodiment, an example in which the server 200 performs machine learning by a neural network is shown, but the present embodiment is not limited thereto. Among machine learning, supervised learning includes not only neural networks but also various methods such as random forest, support vector machine, and k-nearest neighbor method. These models are common in that they are algorithms that draw boundaries in the feature space stretched by feature vectors and efficiently find decision boundaries. That is, when estimation can be performed by a neural network, machine learning can be used with other supervised learning models.

As described above, according to the present embodiment, the server 200 provides the vehicle 100 with a learned model of a scale corresponding to the computing power of the ECU 150 of the vehicle 100. Therefore, it is possible to suppress the learned model from being unavailable on the vehicle 100 side due to the lack of the computing power of the ECU 150.

What is claimed is:

1. A server comprising a processor configured to:
receive a data set from a vehicle;
create a plurality of learned models of different scales by performing machine learning using the data set;
receive, from the vehicle, specification information of an electronic control unit that controls the vehicle by applying a learned model;
determine a scale of the learned model based on the specification information received from the vehicle;
obtain a computing power of the electronic control unit by applying the specification information to a map or a function that defines a relationship between the computing power and a plurality of parameters of the electronic control unit, the plurality of parameters including a clock frequency of the electronic control unit, a number of cores of the electronic control unit, and a memory capacity of the electronic control unit;
select the learned model from the plurality of learned models that have been created and stored in association with map information, the selected learned model being of the scale corresponding to the computing power of the electronic control unit; and
transmit the learned model to the vehicle, wherein the processor is configured to transmit the learned model of a larger scale to the vehicle equipped with the electronic control unit having a high computing power, than to the vehicle equipped with the electronic control unit having a low computing power, wherein the high computing power is higher than the low computing power,
wherein the processor is configured to:
create the learned model for each region in which the vehicle travels, the learned model being of a larger scale as the region is larger; and
transmit the learned model corresponding to the region in which the vehicle currently travels based on position information of the vehicle,
wherein the map information is searchable and divided into a plurality of regions in which the vehicle travels, the plurality of regions of the map being divided based on a latitude and a longitude to set each region,
wherein each region of the plurality of regions takes into account a plurality of factors, the plurality of factors including a density of roads, a number of intersections, a width of the roads, a curvature of the roads, a gradient of the roads, and an amount of traffic of other vehicles,
wherein each learned model corresponding to a current position in which the vehicle currently travels is applied to the vehicle to perform vehicle control in accordance with each of the plurality of factors, and wherein the vehicle autonomously travels in a predetermined order of the plurality of regions, and the vehicle sequentially receives the learned model corresponding to each region it autonomously travels in and sequentially updates the learned model stored in a memory.

2. The server according to claim 1, wherein the processor is configured to perform the machine learning by a neural network.

3. The server according to claim 2, wherein the scale of the learned model is larger as the number of hidden layers or the number of nodes existing in the hidden layers increases.

4. The server according to claim 1, wherein the processor is configured to transmit the learned model at a higher transmission frequency to the vehicle equipped with the electronic control unit having the low computing power, than to the vehicle equipped with the electronic control unit having the high computing power.

5. The server according to claim 1, wherein the processor is configured to increase an update frequency of the learned model in response to the learned model including a predetermined type of smaller-scale learned model corresponding to at least one region of the plurality of regions.

6. A control device of a vehicle that controls the vehicle by applying a learned model, the control device comprising a processor configured to:
transmit specification information of the control device to a server;
receive the learned model of a scale corresponding to a computing power of the control device from the server; and
control the vehicle by applying the learned model of the scale corresponding to the computing power, the learned model being received from the server, wherein:
the server is configured to:
determine the scale of the learned model based on the specification information;
obtain the computing power of the control device by applying the specification information to a map or a function that defines a relationship between the computing power and a plurality of parameters of the control device, the plurality of parameters including a clock frequency of the control device, a number of cores of the control device, and a memory capacity of the control device;
select the learned model from a plurality of learned models that have been created and stored in association with map information, the selected learned model being of the scale corresponding to the computing power of the control device; and
transmit the learned model to the vehicle, wherein the server is configured to transmit the learned model of a larger scale to the vehicle equipped with the control device having a high computing power, than to the vehicle equipped with the control device having a low computing power, wherein the high computing power is higher than the low computing power,
wherein the server is configured to:
create the learned model for each region in which the vehicle travels, the learned model being of a larger scale as the region is larger; and
transmit the learned model corresponding to the region in which the vehicle currently travels based on position information of the vehicle,
wherein the map information is searchable and divided into a plurality of regions in which the vehicle travels, the plurality of regions of the map being divided based on a latitude and a longitude to set each region,
wherein each region of the plurality of regions takes into account a plurality of factors, the plurality of factors including a density of roads, a number of intersections, a width of the roads, a curvature of the roads, a gradient of the roads, and an amount of traffic of other vehicles,
wherein each learned model corresponding to a current position in which the vehicle currently travels is applied to the vehicle to perform vehicle control in accordance with each of the plurality of factors, and
wherein the vehicle autonomously travels in a predetermined order of the plurality of regions, and the vehicle sequentially receives the learned model corresponding to each region it autonomously travels in and sequentially updates the learned model stored in a memory.

7. The control device according to claim 6, wherein the processor is configured to:
transmit a data set to the server; and
receive the learned model created by the server by performing machine learning using the data set.

8. The control device according to claim 7, wherein:
the server performs the machine learning by a neural network; and
the scale of the learned model is larger as the number of hidden layers or the number of nodes existing in the hidden layers increases.

9. The control device according to claim 6, wherein the processor is configured to:
receive the learned model corresponding to the region in which the vehicle currently travels for each of the plurality of regions in which the vehicle travels; and
receive the learned model of the larger scale as the region is larger.

10. The control device according to claim 9, wherein the processor is configured to receive the learned model at a higher reception frequency as the computing power is lower.

11. A machine learning system for a vehicle, the machine learning system comprising:
a server that creates a learned model by performing learning using a data set received from the vehicle; and
a control device for the vehicle for controlling the vehicle by applying the learned model, wherein:
the control device includes a first processor configured to:
transmit the data set to the server;
transmit specification information of the control device to the server;
receive the learned model of a scale corresponding to a computing power of the control device from the server; and
control the vehicle by applying the learned model of the scale corresponding to the computing power, the learned model being received from the server; and
the server includes a second processor configured to:
receive the data set from the vehicle;
create a plurality of learned models of different scales by performing machine learning using the data set;
determine the scale of the learned model based on the specification information;
obtain the computing power of the control device by applying the specification information to a map or a function that defines a relationship between the computing power and a plurality of parameters of the control device, the plurality of parameters including a clock frequency of the control device, a number of cores of the control device, and a memory capacity of the control device;

select the learned model from the plurality of learned models that have been created and stored in association with map information, the selected learned model being of the scale corresponding to the computing power of the control device; and transmit the learned model to the vehicle, wherein the server is configured to transmit the learned model of a larger scale to the vehicle equipped with the control device having a high computing power, than to the vehicle equipped with the control device having a low computing power, wherein the high computing power is higher than the low computing power, wherein the second processor is configured to:

create the learned model for each region in which the vehicle travels, the learned model being of a larger scale as the region is larger; and transmit the learned model corresponding to the region in which the vehicle currently travels based on position information of the vehicle, wherein the map information is searchable and divided into a plurality of regions in which the vehicle travels, the plurality of regions of the map being divided based on a latitude and a longitude to set each region, wherein each region of the plurality of regions takes into account a plurality of factors, the plurality of factors including a density of roads, a number of intersections, a width of the roads, a curvature of the roads, a gradient of the roads, and an amount of traffic of other vehicles, wherein each learned model corresponding to a current position in which the vehicle currently travels is applied to the vehicle to perform vehicle control in accordance with each of the plurality of factors, and wherein the vehicle autonomously travels in a predetermined order of the plurality of regions, and the vehicle sequentially receives the learned model corresponding to each region it autonomously travels in and sequentially updates the learned model stored in a memory.

12. The machine learning system according to claim 11, wherein the second processor is configured to perform the machine learning by a neural network.

13. The machine learning system according to claim 12, wherein the scale of the learned model is larger as the number of hidden layers or the number of nodes existing in the hidden layers increases.

14. The machine learning system according to claim 11, wherein:

the first processor is configured to receive the learned model corresponding to the region in which the vehicle currently travels for each of the plurality of regions in which the vehicle travels.

15. The machine learning system according to claim 14, wherein:

the second processor is configured to transmit the learned model at a higher transmission frequency to the vehicle equipped with the control device having the low computing power, than to the vehicle equipped with the control device having the high computing power; and the first processor is configured to receive the learned model at a higher reception frequency as the computing power is lower.

* * * * *